Aug. 1, 1933.                G. BERT 'ODATTO                1,920,877
                           POWER TRANSMISSION UNIT
                             Filed March 7, 1933
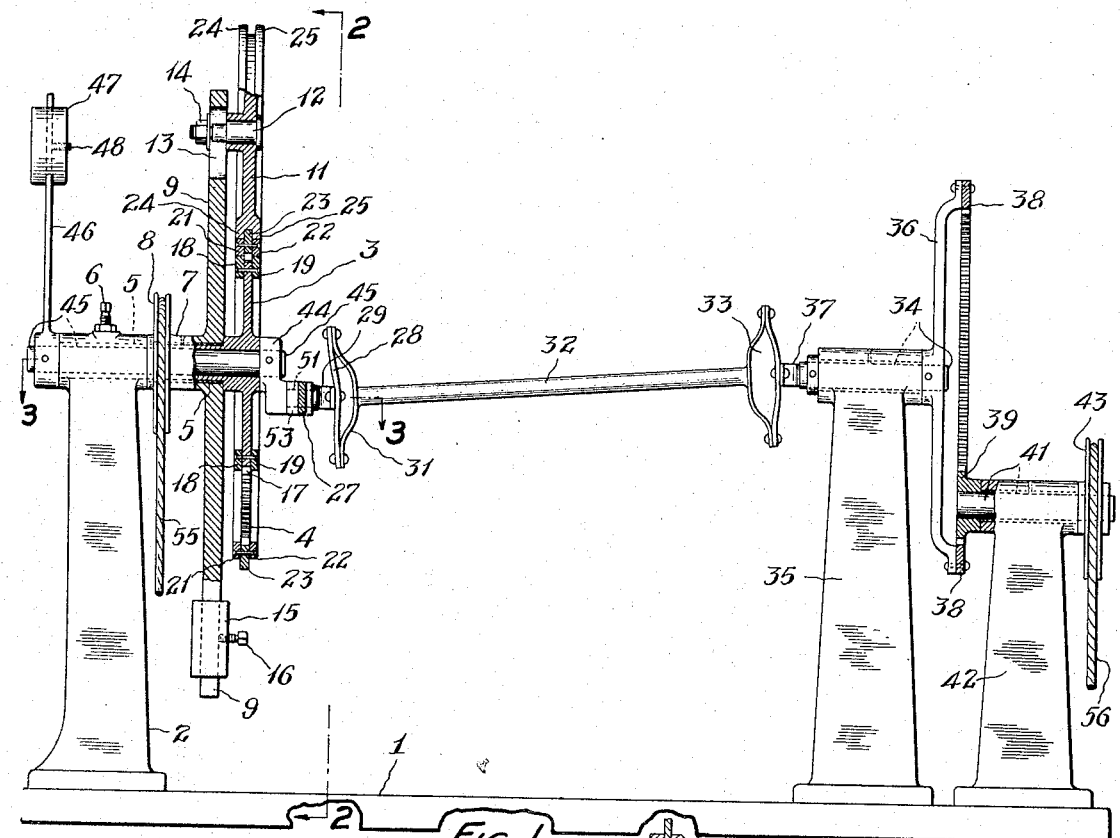
Fig. 1.
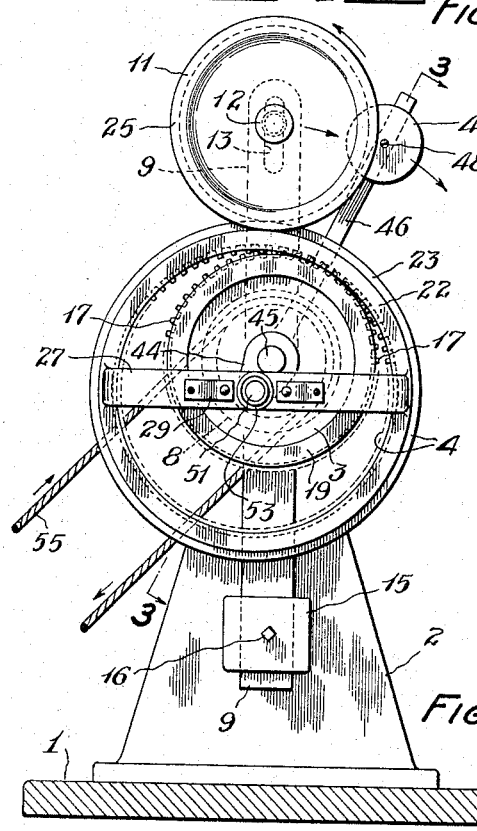
Fig. 2.
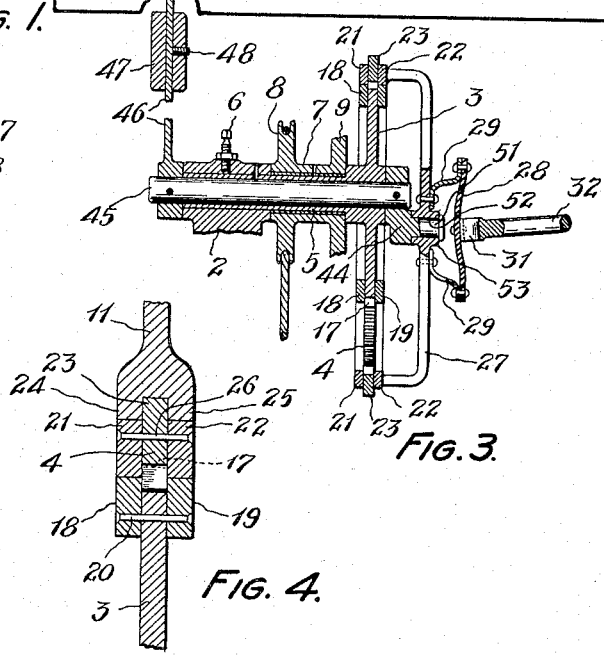
Fig. 3.
Fig. 4.
INVENTOR:
GEORGE BERT'ODATTO
BY Saywell & Wesseler,
ATTORNEYS Patented Aug. 1, 1933

1,920,877

UNITED STATES PATENT OFFICE 1,920,877

POWER TRANSMISSION UNIT

George Bert 'Odatto, Cleveland, Ohio, assignor of one-fifth to Robert L. Beck and one-fifth to James G. Hill, Cleveland, Ohio Application March 7, 1933. Serial No. 659,969

9 Claims. (Cl. 74—7)

This invention, as indicated, relates to a power transmission unit. More particularly, it comprises an element for incorporation in a machine unit or power transmission line embodying a fixed gear member having gear teeth about its outer circumference engaged by an internal gear unit adapted to move eccentrically thereabout and to drive a sleeve through the medium of an extension arm carrying a roller adapted to ride on the circumference of the internal gear. The gear ratios from the power source to the point of application of the power may be varied in accordance with the work to be carried on and the power may be applied at either end of the apparatus. Thus, for example, the unit is adapted for a power transmission device when increased speed is in view, or when a reduction in speed is desired. The apparatus may be utilized to operate an electric generator when the speed is stepped up, or may be applied to a compact type of hoisting mechanism when less speed and greater power is in contemplation. The invention is also suitable for the transmission of power at the same speed in order to obtain certain effects from associated mechanism.

The principal object of the present invention is to provide a power transmission unit in the form of an internal ring gear associated with a roller and transmission means, so that the amount of friction involved in the transfer of power will be reduced to a minimum and mechanical advantage be maintained at a maximum.

Another object of the invention is to provide a compact mechanism having speed changing or power increasing features as may be determined, such mechanism also being relatively noiseless in operation and able to withstand severe usage.

Another object of the invention is to provide a freely running mechanism wherein power ratios and adjustments may be provided for with greater freedom than is customary with other types of mechanism for the same purpose, and without involving any loss of mechanical advantage through such additional features of adjustment.

Other and further objects of the invention will appear in the course of the following description.

To the accomplishment of the foregoing and related ends, said invention, then, consists of the means hereinafter fully described, and particularly pointed out in the claims, the annexed drawing and the following description setting forth in detail certain mechanism embodying the invention, such disclosed means constituting however, but several of various forms in which the principle of the invention may be used.

In said annexed drawing:

Figure 1 is a side elevation partly in section, showing an apparatus embodying the principles of the invention;

Figure 2 is a vertical transverse sectional view taken along the line 2—2, shown in Figure 1, looking in the direction of the arrows;

Figure 3 is a vertical sectional view taken along the lines 3—3, shown in Figures 1 and 2, looking in the direction of the arrows; and Figure 4 is an enlarged sectional detail view showing the engagement of the internal gear with the fixed gear, and roller.

As will be clearly seen from Figure 1 of the drawing, the apparatus comprises a base member 1 having a standard 2, carrying in fixed relation at one end thereof a disk 3 having gear teeth about its circumference upon which is engaged an internal gear 4 in the form of an annular member of relatively slight thickness and with a smooth outer circumference. The fixed gear is supported on a bearing sleeve 5 held against rotation in said support by means of a set screw 6 at the top thereof. Upon said sleeve is rotatably supported a second sleeve 7 carrying a pulley 8 at one end, and an extension arm 9 firmly secured to its opposite end. The extension arm preferably extends in each direction so as to provide for the support of a roller or drive wheel 11 at one end thereof carried upon a stud 12 adjustably engaged with the end of said arm by means of a slot 13 and clamping nut 14. At its opposite end the arm 9 carries a counterweight 15 adapted to be held in position in any desired radial adjustment by means of a set screw 16.

The roller is pivoted upon the stud 12 of sufficient length to bring the same in alinement with the plane of the internal gear member, so that the roller may engage the circumferential portion thereof at a point slightly more than the shortest distance between the circumference of said eccentric member and the center of the bearing supporting the fixed gear. A detailed showing of the engagement of the fixed gear with the internal gear is shown in Figure 3. It will be noted that the fixed gear 3 carries the teeth 17 intermediate a pair of track rings 18, 19 secured on opposite sides of said fixed gear by means of a suitable fastening element 20, and slightly below the top edge of the teeth, said track rings being engaged by a pair of riding rings 21, 22 secured to opposite sides of the tooth carrying member 23 of the internal gear by a suitable fastening element 26 which riding rings abut the flanges 24, 25 of the roller 11 on either side of the outer portion of said member 23.

This angular relation of the roller to the eccentric internal gear may be varied in accordance with the power requirements of the device, but is preferably placed only a slight distance rearwardly of a line extending from said bearing member to a point on the circumference closest to such bearing member measured rearwardly from said line opposite the direction of motion. In order to transmit power to or from the eccentrically moving internal gear member, a strap 27 may be connected across one diameter thereof, said strap being offset from the central plane of said gear member with its ends secured to the sides thereof. A universal joint, preferably in the form of a flexible diaphragm 28, is connected to the strap by means of a yoke 29 at two spaced points, and at right angles thereto is connected by means of a yoke 31 with a shaft 32 having a similar universal joint 33 at its opposite end. A shaft 34 supported in a standard 35 and suitable bracket arms 36 are connected with the outermost yoke 37 of the second universal joint at one end, and on said bracket arms there is preferably supported an internal gear 38 adapted to be driven by a pinion 39 having a suitable ratio to the internal gear to supply the desired power differential. The pinion may be carried on a shaft 41 mounted in a suitable standard 42 and having a pulley 43 at its opposite end as the point of power takeoff or input.

In order to suitably center the internal gear upon the fixed gear, a crank 44 is provided, said crank being supported upon a shaft 45 extending through the sleeve 5 of the fixed gear and projecting beyond the opposite side of the bearing in the standard 2. On such projecting end of the shaft 45 an arm 46 is provided, carrying a counterweight 47 adapted to be positioned by means of a set screw 48 at any point suitable to counterbalance the internal gear. The crank, as clearly shown in Figures 1 and 3, is provided with an offset bearing section 51 engaged through a suitable bearing 52 provided in a boss 53 formed in the strap or cross bar 27 attached to the internal gear.

With an apparatus of the character described, should power be applied through the pulley 43 last referred to, it will be transmitted with a decrease of speed and an increase of power through the several shafts and universal joints to the eccentrically moving internal gear 4. The last named gear will be carried about the fixed gear member 3 and will be brought into driving relation through its circumference with the roller 11 on the end of the cross arm 9. The roller will be forced around the circumference of the eccentric element as it rotates about the fixed gear member and the ratio of its revolutions will be determined by the number of teeth in the internal gear and on the fixed gear member. As the arm rotates it will carry with it the sleeve 5 and its associated pulley 8, and power may be taken from the pulley in the usual manner by means of a drive belt 55.

Should it be desired to operate the device to reduce the speed, the power may be applied through the last mentioned pulley 8, and thence through the arm 9 and roller 11 to the circumference of the eccentric member 4, which will be forced around the fixed gear member 3. The power may be transmitted through the universal joints and shafts as shown in Figure 1, to the internal gear 38 and the pinion 39 at the opposite end of the device, the power being taken from the pulley 43 by means of a suitable belt 56.

Through the use of suitable gear ratios substantially any desired ratio of the input and output of the transmission line may be provided for. The action of the internal gear in driving an element through a roller contacting with its peripheral portion permits a most advantageous application of power in that a long leverage is provided for in a minimum of space and with a negligible amount of friction. The engagement of the gear teeth of the internal gear with the fixed gear member insures quietness of operation as well as freedom from vibration and a high degree of mechanical efficiency. The arm and roller will be driven completely around the circumference of the eccentric gear several times while said gear makes one revolution about the fixed gear member. This provides for a step-up in the speed of operation of the sleeve and permits the application of power most efficiently to the arm rotating said sleeve.

When the power is applied to the sleeve carrying the arm and roller, the roller acts upon the opposite side of the internal gear member from its position when used as a driven member, and forces the internal gear around the fixed gear member. The internal gear member will make several eccentric movements about the fixed gear member while it is making a single revolution as to its own circumference, and according will reduce the speed of any device driven by a shaft connected to such internal gear. A shaft, as stated, may be connected to said internal gear by means of a strap and universal joints or through a crank arm, as may be desired.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A power transmission unit having in combination a fixed gear having external gear teeth, an internal gear engaged therewith and moving eccentrically about said fixed gear, a pivoted member mounted concentrically with said fixed gear member and carrying a roller adapted to engage the circumference of said internal gear, and means connected to said internal gear for supporting the same and for transmitting power.

2. A power transmission unit having in combination a fixed gear having external gear teeth, an internal gear engaged therewith and moving eccentrically about said fixed gear, a pivoted member mounted concentrically with said fixed gear member and carrying a roller adapted to engage the circumference of said internal gear, means connected to said internal gear for supporting the same and for transmitting power, and means providing a differential power ratio in connection with said last-named means.

3. An apparatus of the character described having in combination a base, a standard mounted on said base, a bearing member supported on said standard, a fixed gear mounted on the extreme end of said bearing member, a sleeve mounted on said bearing member intermediate said standard and said fixed gear, a cross arm secured to said sleeve adjacent said fixed gear, a pulley secured to the opposite end of said sleeve, a roller carried at one end of said cross arm, an internal gear engaged upon said fixed gear with its circumferential portion bearing against said roller, and means for supporting said internal gear for eccentric movement about said fixed gear.

4. An apparatus of the character described having in combination a base, a standard mounted on said base, a tubular bearing member supported on said standard, means for clamping said cylindrical bearing member to said standard, a fixed gear mounted on one end of said bearing member, a shaft extending through said tubular bearing member, a crank mounted on one end of said shaft and carrying a stub shaft adjacent its free end, a sleeve mounted on said bearing member intermediate said standard and said fixed gear, a cross arm secured to said sleeve adjacent said fixed gear, a pulley secured at the opposite end of said sleeve, a roller carried at one end of said cross arm, an internal gear engaged upon said fixed gear with its circumferential portion bearing against said roller, means secured to said internal gear adapted to support a bearing member therefor in spaced relation thereto, said bearing being mounted on said stub shaft of said crank, and means for driving said internal gear about said fixed gear.

5. A power transmission unit having in combination a fixed gear having external gear teeth, an internal gear of larger diameter than said fixed gear, means for moving said internal gear eccentrically about said fixed gear, a pivot member for said internal gear adapted to move concentrically about said fixed gear, a roller supported to move concentrically about said fixed gear and held in running engagement with the circumference of said internal gear, and means for transmitting power through said internal gear.

6. A power transmission unit having in combination a fixed gear having external gear teeth, an internal gear of larger diameter than said fixed gear, means for moving said internal gear eccentrically about said fixed gear, a roller supported to move concentrically about said fixed gear and held in running engagement with the circumference of said internal gear, and means connected to said internal gear for supporting the same and for transmitting power.

7. A power transmission unit having in combination a fixed gear having external gear teeth, running rings on each side of said external gear teeth presenting running surfaces slightly below the upper portions of said teeth, an internal gear of larger diameter than said fixed gear, riding rings on each side of said internal gear teeth presenting riding surfaces slightly below the upper portions of said teeth, means for moving said internal gear eccentrically about said fixed gear, a pivot member for said internal gear adapted to move concentrically about said fixed gear, a roller supported to move concentrically about said fixed gear and held in running engagement with the circumference of said internal gear, and means for transmitting power through said internal gear.

8. A power transmission unit having in combination a fixed gear having external gear teeth, a member pivoted centrally of said fixed gear and providing a bearing member moving concentrically about the same in spaced relation outwardly of the circumference thereof, external gear teeth on said fixed gear, an internal gear having a bearing member spaced outwardly from the central plane thereof engaged upon said concentric bearing member supported on said fixed gear, a roller member adapted to contact with the circumference of said internal gear, means for supporting said roller for concentric movement about said fixed gear, means for transmitting power connected with said roller, and means for transmitting power connected with said internal gear.

9. A power transmission unit having in combination a fixed gear having external gear teeth, a member pivoted centrally of said fixed gear and providing a bearing member moving concentrically about the same in spaced relation outwardly of the circumference thereof, external gear teeth on said fixed gear, an internal gear having a bearing member spaced outwardly from the central plane thereof engaged upon said concentric bearing member supported on said fixed gear, running rings secured to said fixed gear slightly above the medial point of the teeth thereof and riding rings secured to said internal gear slightly above the medial point of the teeth thereof, said internal gear teeth being engaged with the external gear teeth of said fixed gear with said rings in running contact with each other, a roller member adapted to contact with the circumference of said internal gear, means for supporting said roller for concentric movement about said fixed gear, means for transmitting power connected with said roller, and means for transmitting power connected with said internal gear.

GEORGE BERT 'ODATTO.